(12) United States Patent
Malina et al.

(10) Patent No.: US 11,386,925 B2
(45) Date of Patent: Jul. 12, 2022

(54) DATA STORAGE DEVICE COMPENSATING FOR HEAD/TAPE WEAR

(71) Applicant: Western Digital Technologies, Inc., San Jose, CA (US)

(72) Inventors: James N. Malina, Irvine, CA (US); Mark L. Watson, Boulder, CO (US); William B. Boyle, Lake Forest, CA (US); David W. Chew, San Juan Capistrano, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/178,376

(22) Filed: Feb. 18, 2021

(65) Prior Publication Data

US 2022/0068303 A1    Mar. 3, 2022

Related U.S. Application Data

(60) Provisional application No. 63/069,870, filed on Aug. 25, 2020.

(51) Int. Cl.
| | |
|---|---|
| *G11B 21/02* | (2006.01) |
| *G11B 5/55* | (2006.01) |
| *G11B 20/18* | (2006.01) |
| *G11B 5/255* | (2006.01) |

(52) U.S. Cl.
CPC ............ *G11B 5/5578* (2013.01); *G11B 5/255* (2013.01); *G11B 5/5547* (2013.01); *G11B 20/18* (2013.01)

(58) Field of Classification Search
CPC ...................................................... G11B 21/02
See application file for complete search history.

(56) References Cited

U.S. PATENT DOCUMENTS

| | | | |
|---|---|---|---|
| 5,446,605 | A | 8/1995 | Umehara et al. |
| 6,763,427 | B1 | 7/2004 | Doi et al. |
| 7,835,103 | B2 | 11/2010 | Anderson et al. |
| 8,526,136 | B2 | 9/2013 | Katagiri et al. |
| 8,654,476 | B2 | 2/2014 | Katagiri et al. |
| 8,867,160 | B2 | 10/2014 | Katagiri et al. |
| 9,135,949 | B2 | 9/2015 | Shiratori et al. |
| 9,513,818 | B2 | 12/2016 | Whitney |
| 9,934,816 | B1 | 4/2018 | Miyamura et al. |

*Primary Examiner* — K. Wong
(74) *Attorney, Agent, or Firm* — Patterson + Sheridan, LLP; Steven H. Versteeg (57) ABSTRACT

A data storage device is disclosed comprising at least one head configured to access a magnetic tape. A plurality of access commands are stored in a command queue, and a wear value is generated for each access command in the command queue, wherein the wear value represents a level of wear on the head or magnetic tape associated with executing the access command. An execution order for the access commands is generated based on the wear values, and at least one of the access commands is executed based on the execution order.

26 Claims, 6 Drawing Sheets

| Physical | Track | BOT | 0 | 1 | 2 | 3 | 4 | 5 | EOT |
|---|---|---|---|---|---|---|---|---|---|
| Band 0 | 0 | | 16 | 16 | 16 | 16 | 16 | 16 | |
| Band 0 | 1 | | 8 | 9 | 10 | 11 | 12 | 13 | |
| Band 0 | 2 | | 1 | 2 | 3 | 4 | 5 | 5 | |
| Band 1 | 3 | | 8 | 7 | 7 | 6 | 6 | 6 | |
| Band 1 | 4 | | 16 | 16 | 15 | 14 | 13 | 13 | |
| Band 1 | 5 | | 20 | 19 | 18 | 17 | 16 | 16 | |

FIG. 2A

| File | Track | Length | Start_Direction | Start_Seg | End_Seg | | |
|---|---|---|---|---|---|---|---|
| 1 | 2 | 1 | F | 0 (BOT) | 1 | | |
| 2 | 2 | 1 | F | 1 | 2 | | |
| 3 | 2 | 1 | F | 2 | 3 | | |
| 4 | 2 | 1 | F | 3 | 4 | | |
| 5 | 2 | 2 | F | 4 | 5 (EOT) | wrap | |
| 6 | 3 | 3 | R | 5 (EOT) | 2 | | |
| 7 | 3 | 2 | R | 2 | 0 | | |
| 8 | 3 | 2 | R | 0 (BOT) | 1 | wrap | |
| 9 | 1 | 1 | F | 1 | 2 | | |
| 10 | 1 | 1 | F | 2 | 3 | | |
| 11 | 1 | 1 | F | 3 | 4 | | |
| 12 | 1 | 1 | F | 4 | 5 | | |
| 13 | 1 | 3 | F | 5 | 3 | wrap | |
| 14 | 4 | 1 | R | 3 | 2 | | |
| 15 | 4 | 1 | R | 2 | 1 | | |
| 16 | 4 | 10 | R | 1 | 3 | wrap | Multi-track |
| 17 | 5 | 1 | R | 3 | 3 | | |
| 18 | 5 | 1 | R | 3 | 2 | | |
| 19 | 5 | 1 | R | 2 | 1 | | |
| 20 | 5 | 1 | R | 1 | 0 (BOT) | | |

FIG. 2B

|        | Example 1 | | Example 2 | | Example 3 | | Example 4 | |
|--------|-----------|------|-----------|------|-----------|------|-----------|------|
|        |           | order |          | order |          | order |          | order |
| Active | 1         |      | 4         |      | 13        |      | 16        |      |
| Queue 1 | 13       | 4    | 13        | 13   | 17        | 16   | 17        | 17   |
| Queue 2 | 4        | 13   | 17        | 17   | 10        | 17   | 10        | 18   |
| Queue 3 | 17       | 17   | 10        | 10   | 16        | 10   | 18        | 10   |

FIG. 3A

|             |         | Lateral | Reversal | Length |        |
|-------------|---------|---------|----------|--------|--------|
| analysis ex1 | 1 to 13 | 1       | 0        | 4      |        |
|             | 1 to 4  | 0       | 0        | 2      | winner |
|             | 1 to 17 | 3       | 1        | 3      |        |
|             |         |         |          |        |        |
|             | 4 to 13 | 1       | 0        | 2      | winner |
|             | 4 to 17 | 3       | 1        | 0      |        |
|             |         |         |          |        |        |
| analysis ex2 | 4 to 13 | 1       | 0        | 2      | winner |
|             | 4 to 17 | 3       | 1        | 0      |        |
|             | 4 to 10 | 1       | 1        | 1      |        |
|             |         |         |          |        |        |
|             | 13-17   | 1       | 0        | 1      | winner |
|             | 13-10   | 3       | 1        | 2      |        |
|             |         |         |          |        |        |
| analysis ex3 | 13-17   | 1       | 0        | 1      |        |
|             | 13-10   | 3       | 1        | 2      |        |
|             | 13-16   | 0       | 0        | 3      | winner |
|             |         |         |          |        |        |
|             | 13-17   | 1       | 0        | 1      | winner |
|             | 13-10   | 3       | 1        | 2      |        |
|             |         |         |          |        |        |
| analysis ex4 | 16-17   | 0       | 0        | 1      | winner |
|             | 16-10   | 4       | 1        | 2      |        |
|             | 16-18   | 0       | 0        | 2      |        |
|             |         |         |          |        |        |
|             | 17-10   | 4       | 1        | 1      |        |
|             | 17-18   | 0       | 0        | 1      | winner |

DATA STORAGE DEVICE COMPENSATING FOR HEAD/TAPE WEAR

CROSS REFERENCE TO RELATED APPLICATIONS

This application claims priority to U.S. Provisional Patent Application Ser. No. 63/069,870, filed on Aug. 25, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

DETAILED DESCRIPTION

Figure 1A:
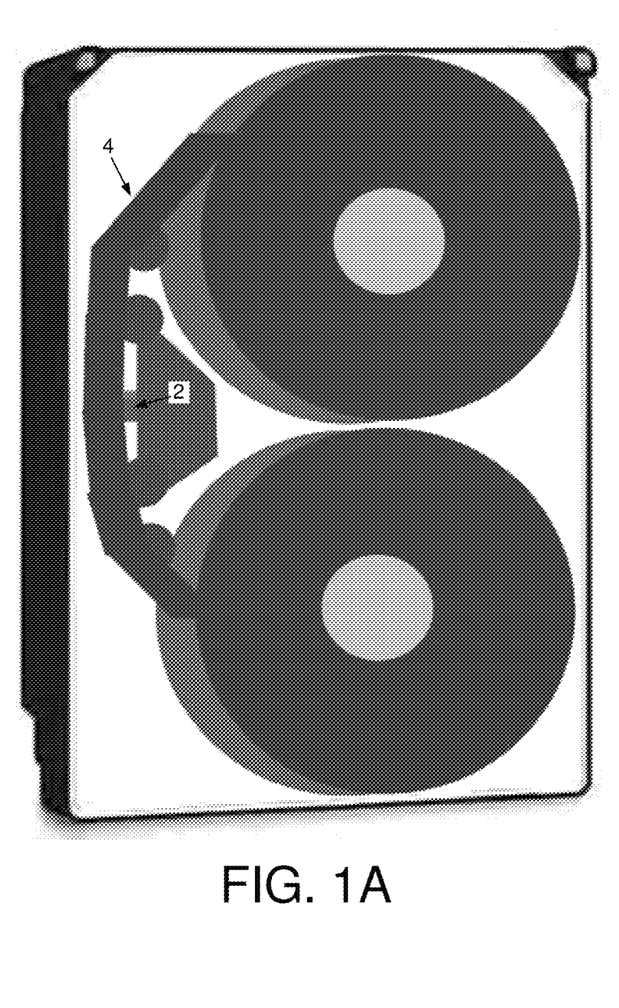
FIG. 1A shows a data storage device according to an embodiment comprising at least one head configured to access a magnetic tape.
Figure 1B:
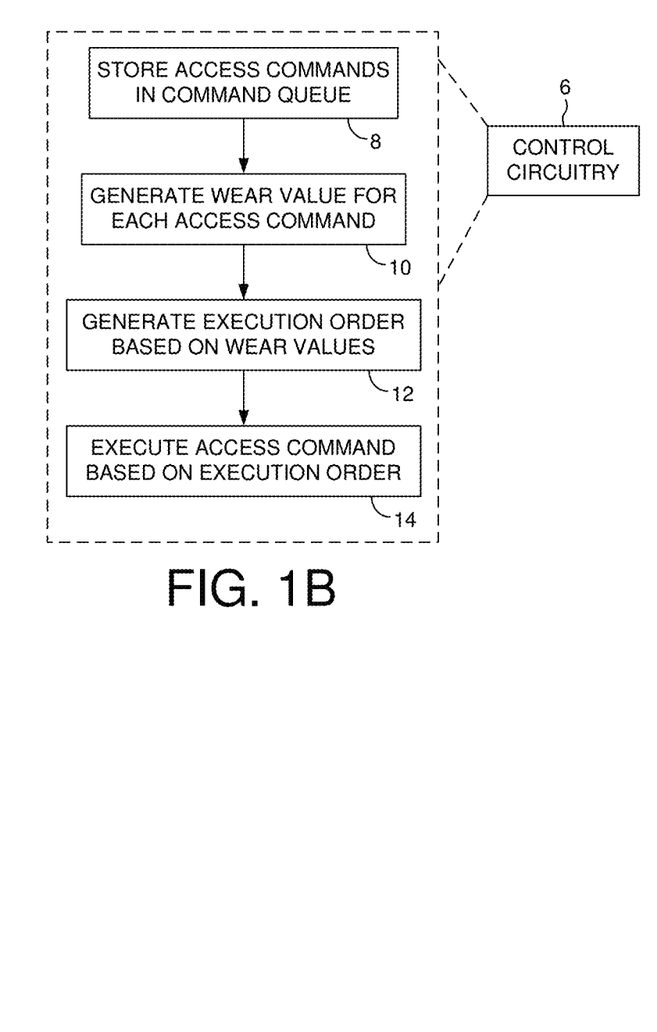
FIG. 1B is a flow diagram according to an embodiment wherein queued access commands are executed in an order that reduces head/tape wear.

FIGS. 1A and 1B show a data storage device according to an embodiment comprising at least one head 2 configured to access a magnetic tape 4. The data storage device further comprises control circuitry 6 configured to execute the flow diagram of FIG. 1B, wherein a plurality of access commands are stored in a command queue (block 8) and a wear value is generated for each access command in the command queue (block 10), wherein the wear value represents a level of wear on the head or magnetic tape associated with executing the access command. An execution order is generated for the access commands based on the wear values (block 12), and at least one of the access commands is executed based on the execution order (block 14).

Figure 1C:
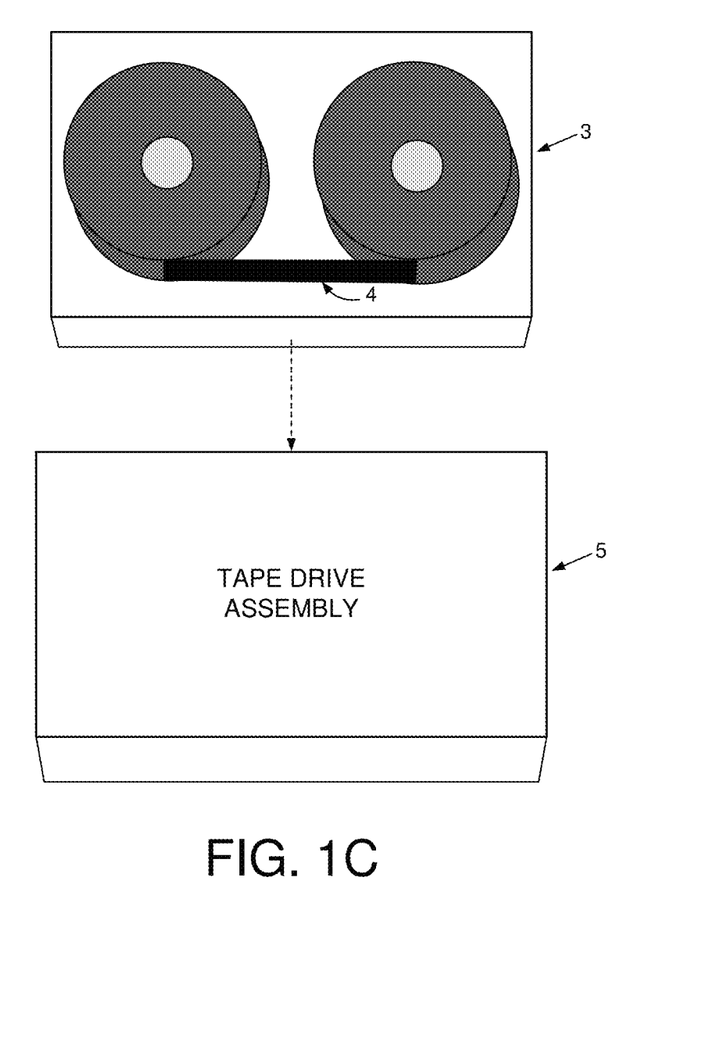
FIG. 1C shows a data storage device comprising a cartridge assembly comprising a magnetic tape, and a tape drive assembly configured to access the magnetic tape.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1C, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry 6 configured to execute the flow diagram of FIG. 1B.

In one embodiment, there is head/tape wear as the magnetic tape moves past the head (or as the head moves relative to the magnetic tape). The head/tape wear may be exacerbated by seeking the head laterally across the magnetic tape and/or by reversing the scan direction of the head. Since the accumulative wear on the head or the magnetic tape may eventually render at least part of the magnetic tape unusable, in one embodiment the access commands received from a host are processed so as to reduce the head/tape wear, thereby extending the life of the data storage device. In one embodiment, the execution order of the access commands is configured based on a wear value generated for each access command. In another embodiment, a segment wear map is maintained for the magnetic tape so as to spread out the tape wear when executing access operations.

Figure 2A:
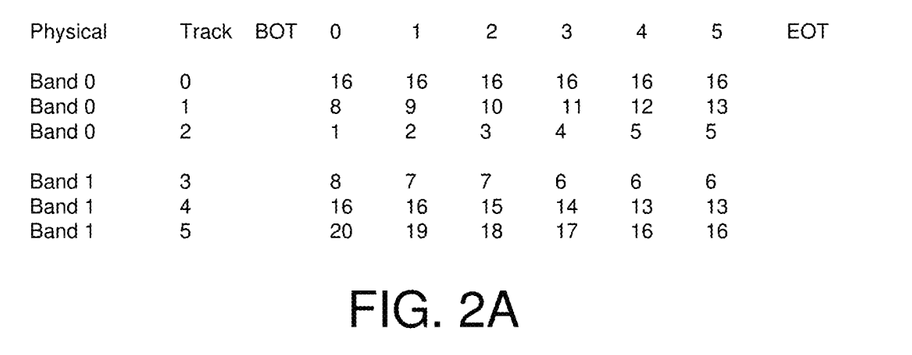
FIG. 2A shows an example of a number of files written to data tracks of the magnetic tape according to an embodiment.
Figure 2B:
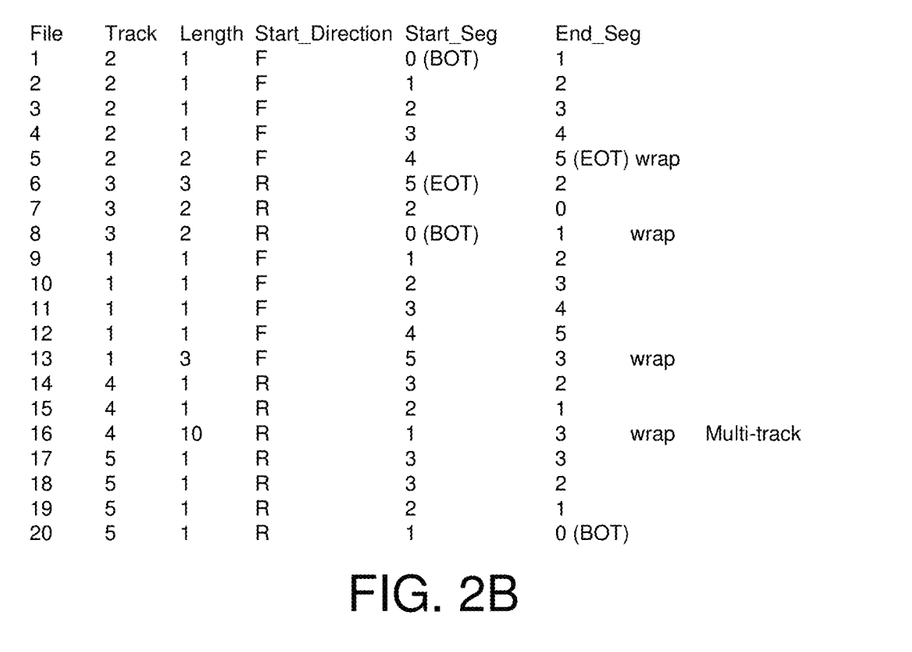
FIG. 2B shows an example database maintained for the files stored on the magnetic tape which facilitates generating the execution order according to an embodiment.

FIG. 2A shows an embodiment wherein the magnetic tape is formatted to comprise two bands of data tracks (Band 0 and Band 1), where each band consists of three data tracks (data tracks 0-5). When accessing Band 0 the magnetic tape scans in a forward direction from right to left, and when accessing Band 1 the magnetic tape scans in a reverse direction from left to right. The magnetic tape is divided into six segments (0-5) from the beginning of tape (BOT) to the end of tape (EOT). In this example, there are 20 files stored in the six data tracks where each file may include one or more of the segments. For example, File 1 is stored in Segment 0 of data track 2, whereas File 16 starts at Segment 0 of data track 0 and ends at Segment 4 of data track 5. Also in this example, the files are written from the BOT to the EOT in a forward direction, and then from the EOT to the BOT in the reverse direction. For example, after writing Segment 5 of data track 2 for File 5 in the forward direction, the head seeks to data track 3 and begins writing File 6 in the reverse direction. FIG. 2B shows a table maintained by the control circuitry 6 representing the physical location of each file on the magnetic tape (for the example of FIG. 2A) which facilitates generating a wear value for each access command in a command queue.

Figure 3A:
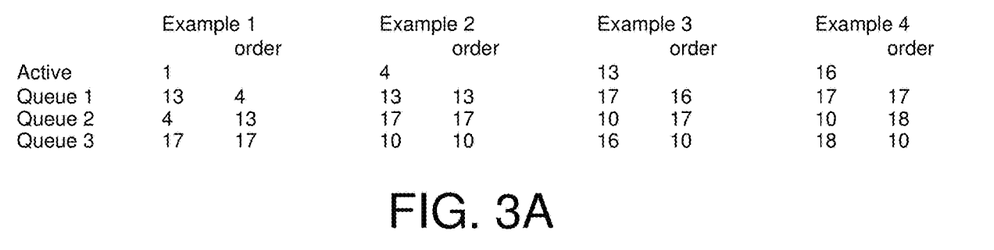
FIG. 3A shows different examples of access commands queued in a command queue and the execution order generated to reduce head/tape wear.

FIG. 3A shows an example of an active access command and three pending access commands stored in a command queue. In this example, each access command corresponds to a file number from the example shown in FIGS. 2A and 2B. That is, in this example each access command corresponds to an access (write or read) of the entire file. Each example shows the active and queued access commands, together with the execution order generated that minimizes the head/tape wear. The examples of FIG. 3A are progressive in that each example corresponds to a new access command being received from the host, and the corresponding new execution order generated for the queued access commands.

Figure 3B:
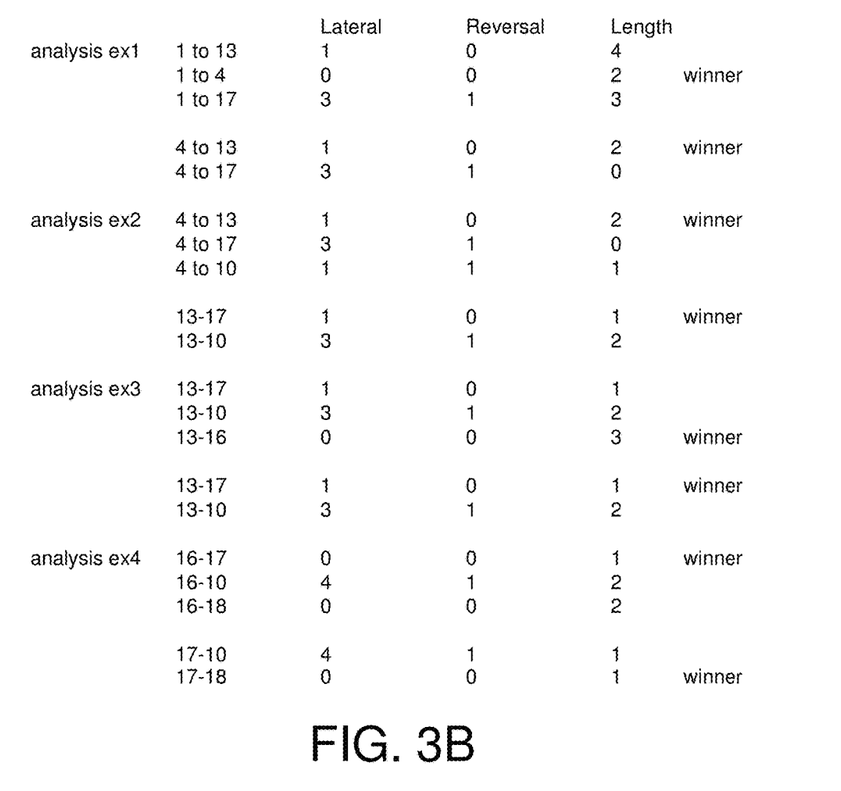
FIG. 3B shows how the execution order is generated for each example of FIG. 3A according to an embodiment.

FIG. 3B shows an analysis of each example in FIG. 3A, wherein a wear value is assigned to each type of movement needed to access a next access command, including a lateral value (lateral seek length), whether not a reversal in direction is needed, and the scan length in segments before the head reaches the first segment of the next access command. In this embodiment, the wear value is incremented for each data track in the seek length and incremented for each segment in the scan length (the weight value for a reversal is one). Referring to the analysis of example 1, if File 13 is accessed after File 1 the head will seek one data track from Track 2 to Track 1 (see FIG. 2A), and the scan length will be four segments (1-4). There is no reversal in the scan direction, and so the Reversal value is zero resulting in an overall wear value of 5. The overall wear value associated with selecting File 4 as the next access command is 2, which is the "winner" since it is the lowest wear value. As shown in FIG. 3B, a wear value is then generated for the next access command after File 4 (i.e., for Files 13 and 17), wherein File 13 is the winner resulting in an execution order of {1, 4, 13, 17} as shown in FIG. 3A. In example 2 of FIG. 3A, the next access command received from the host is to access File 10 which is inserted into the command queue. The execution order is then generated based on the analysis shown in FIG. 3B which results in the updated execution order of {4, 13, 17, 10} and so on for example 3 and example 4.

Any suitable weighting may be assigned to each type of movement needed to access a next access command (i.e., other than the weighting shown in the example of FIG. 3B). For example, in one embodiment the wear value may be incremented more than once for each data track in the seek length if seeking the head laterally across the magnetic tape results in more wear than scanning the magnetic tape longitudinally across the head. Similarly, the wear value may be incremented more than once for a reversal of the scan direction when a reversal results in more wear (of the head or tape) than scanning the magnetic tape across the head.

In one embodiment, an access latency may be generated for each access command in the command queue, wherein the access latency includes an access time for the head to reach a segment of the magnetic tape in order to execute the access command. For example, there is an access latency associated with the scan length and the scan speed that the magnetic tape moves across the head, as well as an access latency associated with the seek length and the seek speed of the head laterally across the magnetic tape. Similarly, there is an access latency associated with reversing the direction of the magnetic tape. In one embodiment, the execution order of the queued access commands may be generated based on a wear value as well as an access latency associated with each access command. For example, in one embodiment the execution order may be generated so as to minimize a predetermined weighted combination of the wear values and the access latencies. When longevity is considered more important than performance, the weighting may be skewed toward minimizing the wear value, and when performance is considered more important, the weighting may be skewed toward minimizing the access latency.

Figure 4:
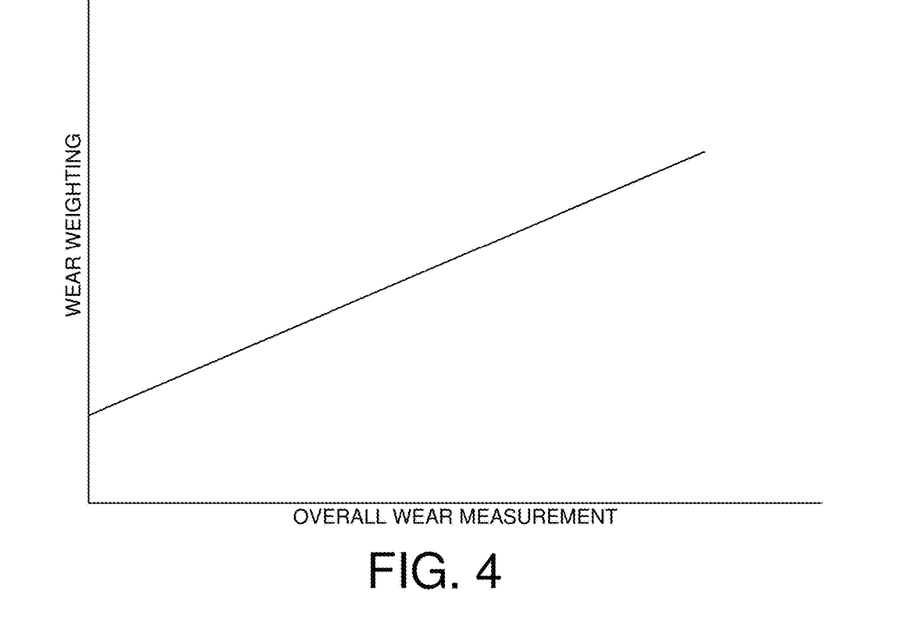
FIG. 4 shows an embodiment wherein the wear values of the access commands are weighted based on an overall wear measurement for the data storage device.

FIG. 4 shows an embodiment wherein the control circuitry 6 is configured to maintain an overall wear measurement representing an overall head/tape wear over the life of the data storage device. In one embodiment, as the overall wear measurement increases due to accessing the magnetic tape over time, the weighting of the wear values increases so that the execution order is generated in a manner that is skewed toward reducing the head/tape wear rather than reducing the access latency. Accordingly in this embodiment, the data storage device may exhibit better performance in the beginning with a predetermined degradation in performance as the overall wear measurement increases. In this manner, the data storage devices that are lightly used, or used with minimal access scans/seeks, may maintain a higher level of performance for a longer period of time.

Figure 5A:
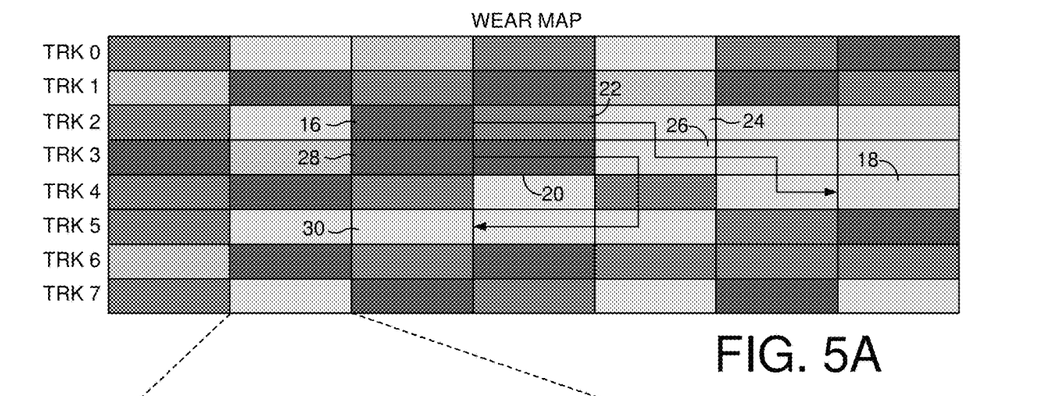
FIG. 5A shows an embodiment wherein an accumulated wear measurement is maintained for each of a plurality of segments of the magnetic tape.

FIG. 5A shows a format of the magnetic tape according to an embodiment comprising a plurality of data tracks, wherein each data track comprises a plurality of segments. In this embodiment, the control circuitry 6 is configured to maintain an accumulated wear measurement for each segment, and seek the head laterally across the magnetic tape based on the accumulated wear measurements. In one embodiment, the accumulated wear measurement for each segment may be updated at a different rate depending on the wear movement. For example, the wear measurement may be incremented by a first amount when the magnetic tape scans past the segment, by a second amount when the head seeks through the segment, and by a third amount when the head reverses direction while over the segment.

In the example of FIG. 5A, the shade of each segment represents the accumulated wear measurement where a lighter shade represents less wear of the segment and a darker shade represents more wear. During a seek operation, the control circuitry 6 may control the position of the head so as to spread out the wear on the segments of the magnetic tape. For example, after the head finishes accessing segment 16 and then seeks to segment 18, the control circuitry 6 avoids seeking through segment 20 since it has a high accumulated wear measurement. Instead, the control circuitry 6 scans the head through segment 22 and then step seeks from data track 2 to data track 3 at segments 24 and 26, and then step seeks to data track 3 prior to reaching the target segment 18. That is, the control circuitry 6 step seeks the head across the data tracks in an order that spreads the resulting tape wear over the segments having the lowest accumulated wear measurement, thereby spreading the tape wear evenly over the segments. In another embodiment, the control circuitry 6 may serpentine seek the head across the data tracks in order to seek through as well as scan through the segments having the lowest accumulated wear measurement.

In another example shown in FIG. 5A, after the head finishes accessing segment 28 and then seeks to segment 30, the control circuitry 6 performs the direction reversal at segment 26 rather than at segment 20 which has a high accumulated wear measurement. That is, in this embodiment scanning through segment 20 results in less wear than performing a direction reversal at the segment, and therefore the reversal direction is deferred until segment 26 which has a lower accumulated wear measurement.

In one embodiment, the accumulated wear measurement for each segment may be taken into account when generating the execution order of the queued access commands as described above. That is, the wear value generated for each pending access command may be based on the head/tape wear due to the movement of the head relative to the tape, as well as the accumulated wear measurement for each of the segments through the candidate seek trajectories.

Figure 5B:
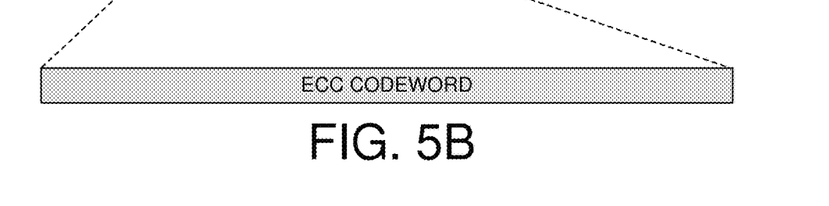
FIG. 5B shows an embodiment wherein each segment of the magnetic tape in FIG. 5A consists of an error correction code (ECC) codeword.

FIG. 5B shows an embodiment wherein each segment of the tape such as shown in FIG. 5A consists of an error correction code (ECC) codeword, where the accumulated wear of each segment affects the ability of the ECC codeword to recover the segment during a read operation. Each ECC codeword may cover any suitable length of the magnetic tape, such as a low density parity check (LDPC) codeword that covers a single data sector, or a parity sector codeword that covers multiple data sectors (multiple LDPC codewords). In yet another embodiment, the ECC codeword may cover a super block of parity sector codewords, for example, an erasure codeword capable of recovering multiple erased LDPC codewords.

In one embodiment, the segments shown in FIG. 5A may be refreshed periodically in order to compensate for degradation over time and temperature, degradation due to inter-track interference, etc. In one embodiment, the refresh threshold that triggers a refresh operation of a segment may be adjusted inversely with the accumulated wear measurement of the segment. That is as the accumulated wear measurement of a segment increases, the refresh of the segment may be triggered sooner to compensate for the wear degradation of the magnetic tape.

In one embodiment, each segment of the magnetic tape such as shown in FIG. 5A may comprise a plurality of data tracks that are accessed concurrently using a plurality of heads integrated into a head bar. In this embodiment, the control circuitry 6 may seek the head bar to a target band of data tracks corresponding to a target segment. Also in this embodiment, the ECC codeword that forms a segment in FIG. 5A may consist of multiple data track codewords (e.g., LDPC codewords) that are concurrently written to the segment using the head bar.

Figure 6A:
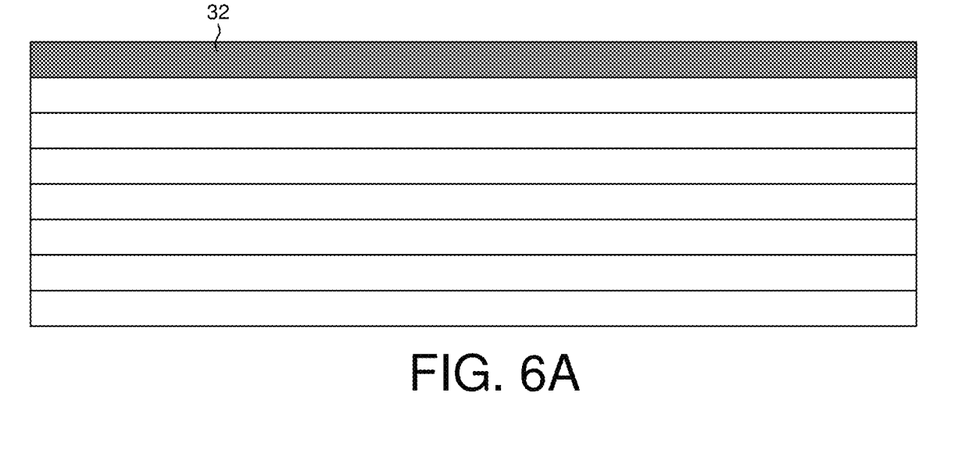
FIGS. 6A-6C show an embodiment wherein part of the magnetic tape is reserved for longitudinal scanning the tape and laterally seeking the head.

FIG. 6A shows an embodiment wherein at least one longitudinal reserved band 32 is defined on the magnetic tape, wherein data is not recorded in the longitudinal reserved band 32. When executing an access command to access a longitudinal data band (e.g., data track or tracks), the head is scanned along the longitudinal reserved band 32 in order to reach the longitudinal location of the data band. A lateral seek then positions the head at the beginning of the data band and the head accesses the data band while the head scans along a length of the data band. In this embodiment, the head may scan along a longitudinal band of the magnetic tape (e.g., reserved band or data band) by actuating the tape past the head or by actuating the head past the tape. Since in this embodiment data is not recorded in the longitudinal reserved band 32, the tape wear due to scanning the head during access operations does not adversely impact previously recorded data, or degrade the recording integrity of the magnetic tape.

Figure 6B:
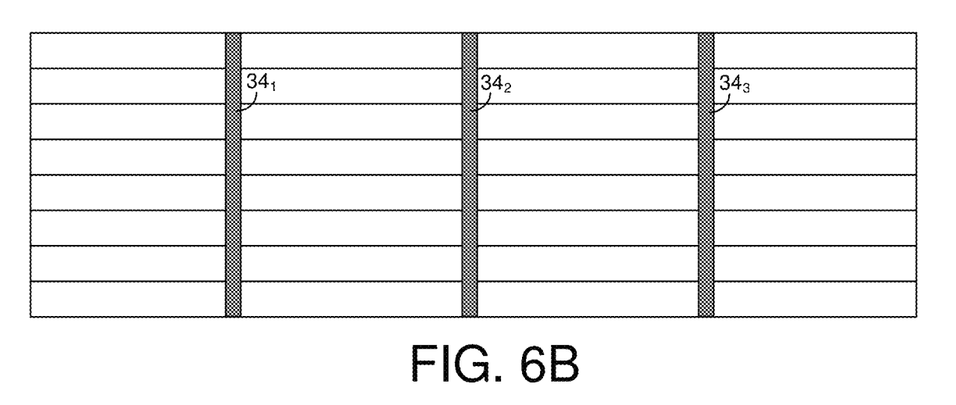

FIG. 6B shows an embodiment wherein at least one lateral reserved band 341 is defined on the magnetic tape, wherein data is not recorded in the lateral reserved band 341. When executing an access command to access a longitudinal data band (e.g., data track or tracks), the head seeks along the lateral reserved band 341 in order to reach the lateral location of the data band. The head then accesses the data band while the head scans along a length of the data band. In this embodiment, the head may scan along a a data band by actuating the tape past the head or by actuating the head past the tape. Since in this embodiment data is not recorded in the lateral reserved band 341, the tape wear due to seeking the head laterally during access operations does not adversely impact previously recorded data, or degrade the recording integrity of the magnetic tape.

Figure 6C:
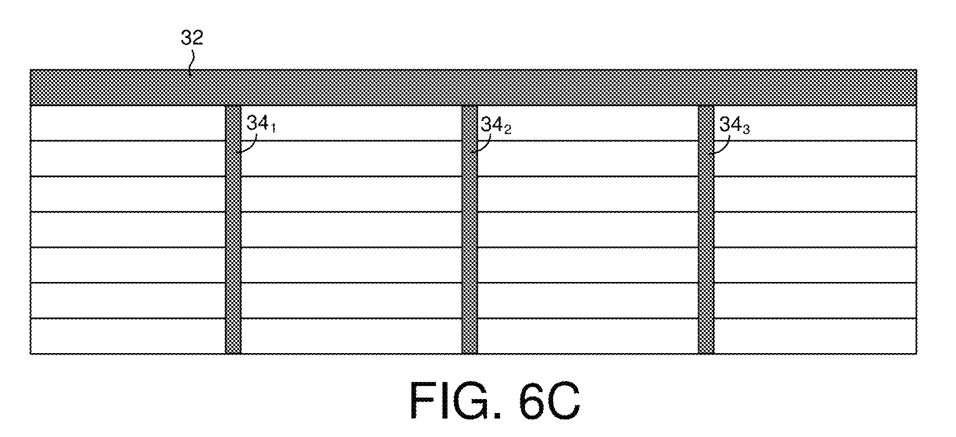

FIG. 6C shows an embodiment wherein at least one longitudinal reserved band 32 and at least one lateral reserved band 341 are defined on the magnetic tape (i.e., FIG. 6C combines the embodiments of FIGS. 6A and 6B). This embodiment avoids tape wear in the data areas of the disk both when scanning the head longitudinally along a longitudinal reserved band as well as seeking the head laterally along a lateral reserved band in order to execute access commands.

In one embodiment, the wear values for generating the execution order of queued access commands as described above may be generated relative to a reserved area of the magnetic tape, such as the longitudinal reserved band of FIG. 6A and/or the lateral reserved band of FIG. 6B. That is, the possible scan/seek trajectories for each queued access command and corresponding wear values may be generated relative to the optional use of the reserved areas during the scan/seek operations. In one embodiment, the optimal scan/seek trajectory that minimizes weighted factors (such as tape wear and access latency) may avoid using the reserved area(s) of the magnetic tape.

In one embodiment, the data storage device may be configured by the host to achieve a desired level of performance versus longevity. For example, a particular customer may configure the data storage device to reduce the significance of head/tape wear on command ordering or seek latency in order to achieve a higher level of performance. The data storage device may reduce the significance of head/tape wear by reducing the weighting of the wear values used for command ordering, or by executing seek operations more aggressively with less consideration given to spreading out tape wear as described above. In this embodiment, trading longevity for performance may lead to an increased "swap out" frequency due to degraded or failing data storage devices that eventually suffer from excessive head/tape wear.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape, the data storage device comprising:
    at least one head configured to access the magnetic tape; and
    control circuitry configured to:
        store a plurality of access commands in a command queue;
        generate a wear value for each access command in the command queue, wherein the wear value represents a level of wear on the head or magnetic tape associated with executing the access command;
        generate an execution order for the access commands based on the wear values; and
        execute at least one of the access commands based on the execution order.

2. The data storage device as recited in claim 1, wherein the data storage device comprises the magnetic tape.

3. The data storage device as recited in claim 1, wherein:
    the magnetic tape is housed in a cartridge assembly; and
    the data storage device comprises a tape drive assembly configured to receive the cartridge assembly.

4. The data storage device as recited in claim 1, wherein the wear value comprises a longitudinal distance of the magnetic tape for the head to reach a segment of the magnetic tape in order to execute the access command.

5. The data storage device as recited in claim 1, wherein the wear value comprises a lateral distance of the magnetic tape for the head to seek to a data track of the magnetic tape in order to execute the access command.

6. The data storage device as recited in claim 1, wherein the wear value comprises a turnaround direction of the magnetic tape in order to execute the access command.

7. The data storage device as recited in claim 1, wherein the wear value is generated by weighting a plurality of factors including at least:
    a longitudinal distance of the magnetic tape for the head to reach a segment of the magnetic tape in order to execute the access command;
    a lateral distance of the magnetic tape for the head to seek to a data track of the magnetic tape in order to execute the access command; and
    a turnaround direction of the magnetic tape in order to execute the access command.

8. The data storage device as recited in claim 1, wherein the control circuitry is further configured to:
    generate an access latency for each access command in the command queue, wherein the access latency includes an access time for the head to reach a segment of the magnetic tape in order to execute the access command; and
    generate the execution order based on the wear values and the access latencies.

9. The data storage device as recited in claim 8, wherein the control circuitry is further configured to:
    maintain an overall wear measurement;
    weight the wear values based on the overall wear measurement; and
    generate the execution order based on the weighted wear values and the access latencies.

10. The data storage device as recited in claim 1, wherein the control circuitry is further configured to:
    maintain an accumulated wear measurement for each of a plurality of segments of the magnetic tape;
    weight the wear values based on the accumulated wear measurements; and
    generate the execution order based on the weighted wear values.

11. The data storage device as recited in claim 10, wherein the control circuitry is further configured to generate the execution order so as to spread out the wear of the magnetic tape across the plurality of segments.

12. The data storage device as recited in claim 10, wherein each segment consists of an error correction code (ECC) codeword.

13. A data storage device configured to access a magnetic tape, the data storage device comprising:
    at least one head configured to access the magnetic tape; and
    control circuitry configured to:
        maintain an accumulated wear measurement for each of a plurality of segments of the magnetic tape; and
        seek the head laterally over the magnetic tape based on the accumulated wear measurements.

14. The data storage device as recited in claim 13, wherein the data storage device comprises the magnetic tape.

15. The data storage device as recited in claim 13, wherein:
    the magnetic tape is housed in a cartridge assembly; and
    the data storage device comprises a tape drive assembly configured to receive the cartridge assembly.

16. The data storage device as recited in claim 13, wherein the control circuitry is further configured to seek the head laterally over the magnetic tape in order to spread out wear of the magnetic tape across the plurality of segments.

17. The data storage device as recited in claim 16, wherein each segment consists of an error correction code (ECC) codeword.

18. The data storage device as recited in claim 13, wherein the control circuitry is further configured to delay the seek in order to prevent the head from passing over one of the segments based on the accumulated wear measurement for the segment.

19. The data storage device as recited in claim 13, wherein the control circuitry is further configured to step seek the head laterally over the magnetic tape based on the accumulated wear measurements.

20. The data storage device as recited in claim 13, wherein the control circuitry is further configured to serpentine seek the head laterally over the magnetic tape based on the accumulated wear measurements.

21. The data storage device as recited in claim 13, wherein the control circuitry is further configured to reverse a direction of the head prior to seeking the head laterally over the magnetic tape based on the accumulated wear measurements.

22. A data storage device configured to access a magnetic tape, the data storage device comprising:
   at least one head configured to access the magnetic tape; and
   a means for generating a wear value for each of a plurality of access command in a command queue, wherein the wear value represents a level of wear on the magnetic tape associated with executing the access command; and
   a means for executing the access commands based on an execution order determined based on the wear values.

23. The data storage device as recited in claim 22, further comprising a means for maintaining an accumulated wear measurement for each of a plurality of segments of the magnetic tape.

24. The data storage device as recited in claim 23, wherein the execution order is determined based on the wear values and the accumulated wear measurements.

25. A data storage device configured to access a magnetic tape, the data storage device comprising:
   at least one head configured to access the magnetic tape; and
   control circuitry configured to:
      define at least one longitudinal reserved band on the magnetic tape, wherein data is not recorded in the longitudinal reserved band;
      receive an access command to access a longitudinal data band on the magnetic tape; and
      scan the head along the longitudinal reserved band and then scan the head along the longitudinal data band in order to execute the access command.

26. A data storage device configured to access a magnetic tape, the data storage device comprising:
   at least one head configured to access the magnetic tape; and
   control circuitry configured to:
      define at least one lateral reserved band on the magnetic tape, wherein data is not recorded in the lateral reserved band;
      receive an access command to access a longitudinal data band on the magnetic tape; and
      seek the head along the lateral reserved band and then scan the head along the longitudinal data band in order to execute the access command.

* * * * *